Aug. 2, 1938.　　　　　　A. VIGNE　　　　　　2,125,757
DISK DRIVE FOR JOURNAL BEARINGS
Filed Aug. 22, 1936
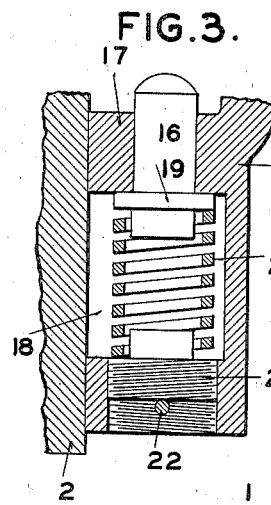
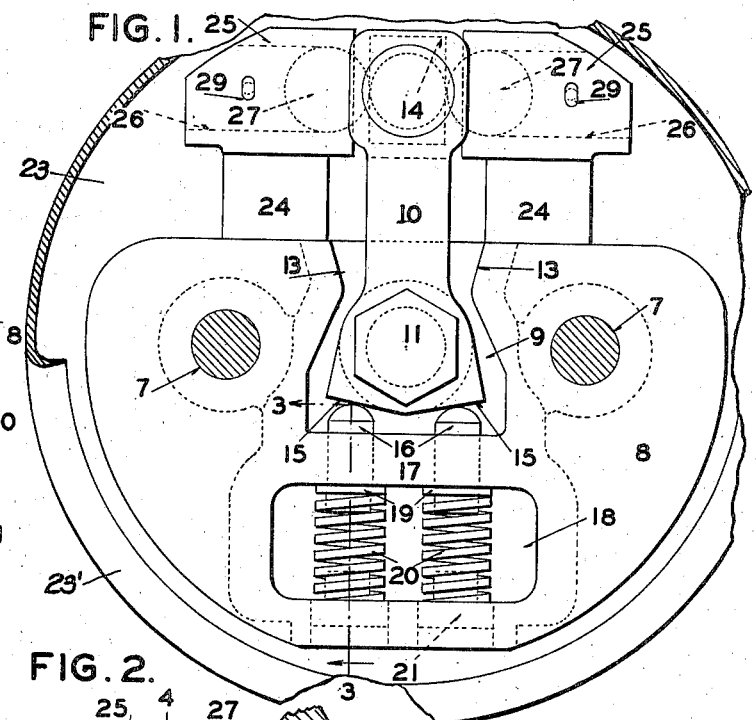
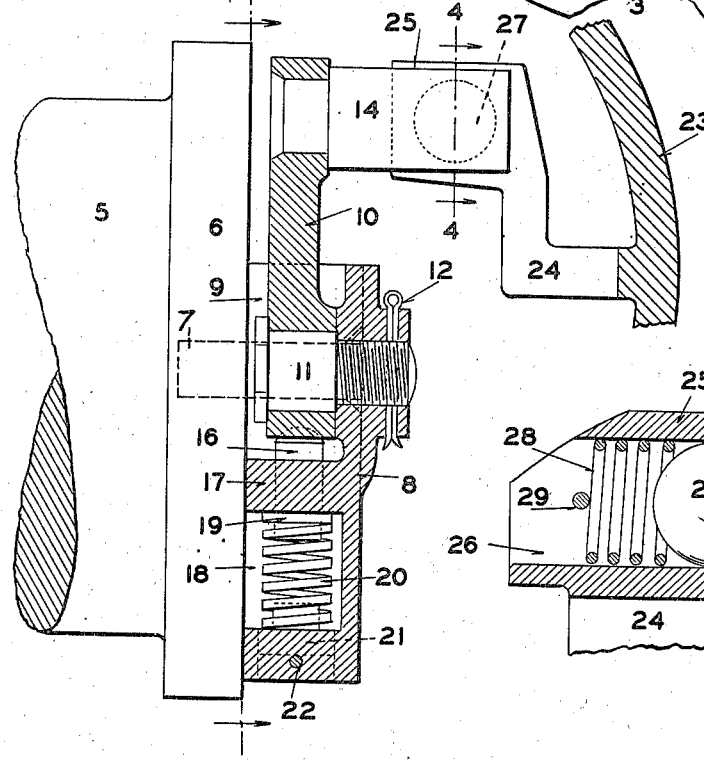
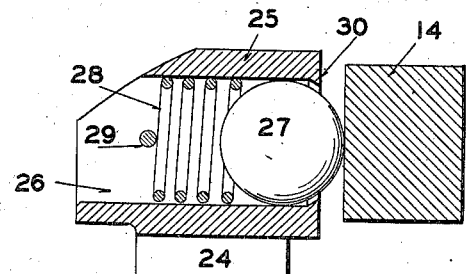
INVENTOR
ALBERT VIGNE
BY
ATTORNEY Patented Aug. 2, 1938

2,125,757

UNITED STATES PATENT OFFICE 2,125,757

DISK DRIVE FOR JOURNAL BEARINGS

Albert Vigne, Webster Groves, Mo., assignor to National Bearing Metals Corporation, St. Louis, Mo., a corporation of New York Application August 22, 1936, Serial No. 97,479

6 Claims. (Cl. 308—85)

My invention relates to a disk drive for journal bearings and more particularly to that type of bearings shown, for example, in my Patent No. 2,081,314 of May, 25, 1937, in which oil contained in a reservoir in the lower part of the bearing box is raised and supplied to the bearing by means of a rotating disk driven by a suitable connection with the axle.

In bearings of the type above referred to it is impossible to maintain alignment of the axis of the disk with that of the axle from which it is driven due to the relative movement of the box and axle both laterally and angularly which takes place while the car is in motion to permit the alignment of the axle and bearing. The driving and driven members are thus placed in eccentric relation with the result that the disk is alternately accelerated and retarded once in each revolution. This introduces objectionable wear and noise in the operation of the device as well as imposing dangerous impact on the engaging parts, especially at high speed.

The object of my invention is to provide a flexible connection between the disk and the axle whereby impacts will be absorbed by spring means and which will permit the driving and driven parts to operate at uniform speeds even though their axes are neither concentric nor parallel.

In the accompanying drawing which illustrates one form of device made in accordance with my invention Figure 1 is a section taken on the line 1—1 of Figure 2; Figure 2 is a vertical central section; Figure 3 is an enlarged section taken on the line 3—3 of Figure 1; and Figure 4 is an enlarged section taken on the line 4—4 of Figure 2.

The numeral 5 indicates the axle of a journal bearing provided with the usual collar 6. Secured to the end face of the collar 6 by means of screws 7 is a supporting plate 8. Formed in the rear face of the plate is a recess 9 for the reception of the inner end of a dog arm 10. This dog arm is mounted on a pin 11 threaded in the plate in alignment with the axis of the axle and may be secured in position by a cotter pin 12. The arm is free to rotate upon the pin but this movement is limited by shoulders 13 formed by the walls of recess 9. Carried by the arm is a dog 14. Formed on the inner end of the arm is a pair of cam faces 15.

The cam faces 15 are engaged, when the arm is in central position, by the rounded ends of pins 16 extending through a web 17 formed between recess 9 and a second recess 18 in the rear face of the plate. Formed on the ends of the pins are collars 19 which are biased toward the face of the web by coil springs 20 positioned in recess 18 and extending between said collars and a pair of screw plugs 21 threaded in the plate. The plugs may be locked in position by cotter pins 22. As the movement of pins 16 is limited by the collars, it will be seen that the action of the pins on the arm functions not only to center it but also to provide spring cushioning means acting against its movement in either direction from the center.

The function of the device is to drive the oil raising disk of a self-lubricating railway journal box such as is described in my prior patent above referred to or in my co-pending application No. 97,480 of even date herewith. This disk 23 is provided on its periphery with an internal trough 23' which serves to raise oil from the lower part of the journal box to the upper part thereof where it is removed by a spoon and transferred to the brass to lubricate the bearing between the latter and the axle.

Carried by the disk 23 is a pair of arms 24, each provided with a jaw 25 having a bore 26 in which is located a steel ball 27 bearing against a face of the dog 14. The ball is biased toward the face of the dog by a coil spring 28 held in the bore of the jaw by a cotter pin 29. The inner end of the bore 26 is reduced, as indicated at 30, to prevent the balls from being forced out of the bores by the springs when the dog is not between them.

In the operation of my device the engagement of the driving dog by balls 27 provides a connection which permits movement of the axes of the two parts both out of alignment and out of parallel without binding of the parts. Further, the springs 28 take up lost motion between the dog and jaws and also serve to absorb impact. The action of springs 18 permits the necessary movement of the dog to permit the uniform rotation of the disk under the urge of inertia when the axes of the driving and driven members are out of alignment. These latter springs also are effective in absorbing impact and so rendering the operation of the device smooth and noiseless.

Having fully described my invention, what I claim as new and desire to secure by Letters Patent of the United States, is:

1. In a device of the class described, the combination with a lubricating disk, of an axle, a resiliently mounted arm carried by one of said parts and provided with a dog, and a pair of jaws carried by the other part, said jaws including a pair of spring-pressed balls engaging said dog.

2. In a device of the class described, the combination with a lubricating disk, of an axle, an arm mounted on said axle, spring-actuated means for said arm permitting limited movement between the arm and the axle, a dog carried by said arm, and a pair of jaws carried by the disk and engaging said dog.

3. In a device of the class described, the combination with a lubricating disk, of an axle, an arm mounted on said axle, spring-actuated means for said arm permitting limited movement between the arm and the axle, a dog carried by said arm, and a pair of jaws carried by the disk, said jaws including a pair of spring-pressed balls engaging the dog.

4. In a device of the class described, the combination with a lubricating disk, of an axle, a supporting plate carried on the axle, an arm pivoted to said plate and having limited movement relative thereto, spring-actuated centering means for the arm carried by the plate, a dog carried by the arm, and a pair of jaws carried by the disk and engaging the dog.

5. In a device of the class described, the combination with a lubricating disk, of an axle, a supporting plate carried on the axle, an arm pivoted to said plate and having limited movement relative thereto, a pair of spring-actuated pins carried by the plate and engaging the arms, means for limiting the movement of the pins for centering the arm, a dog carried by the arm, and a pair of jaws carried by the disk and engaging the dog.

6. In a device of the class described, the combination with a lubricating disk, of an axle, a supporting plate carried on the axle, an arm pivoted to said plate and having limited movement relative thereto, a pair of spring-actuated pins carried by the arm, and a pair of jaws carried by the disk, said jaws including a pair of spring-pressed balls engaging the dog.

ALBERT VIGNE.